No. 841,506. PATENTED JAN. 15, 1907.
L. P. GIBSON.
ARTIFICIAL BAIT.
APPLICATION FILED JUNE 20, 1906.
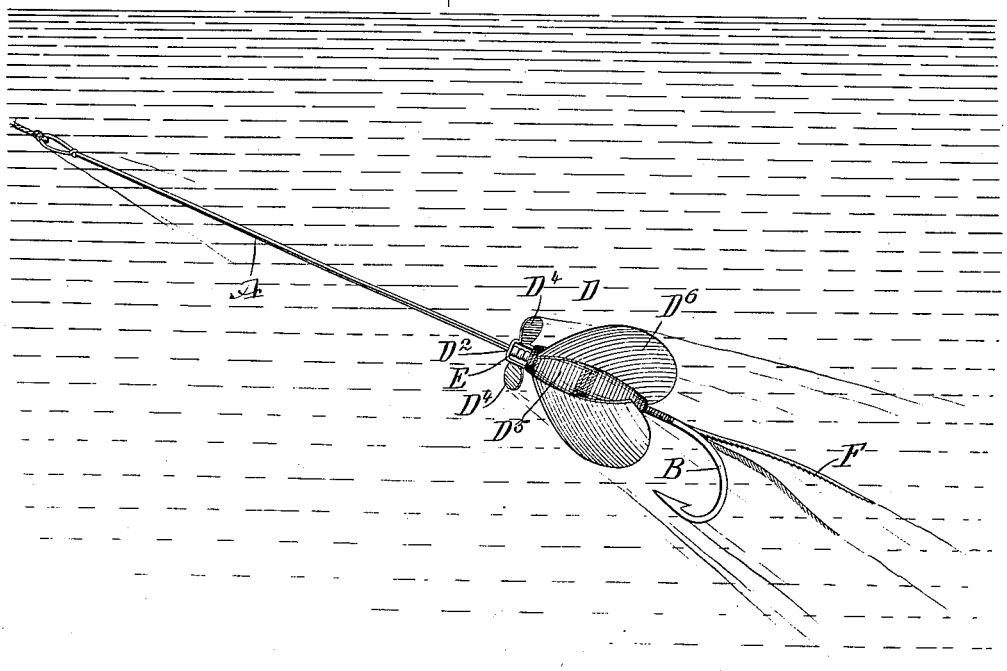
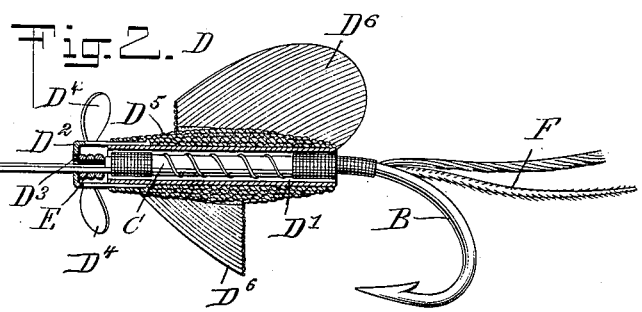
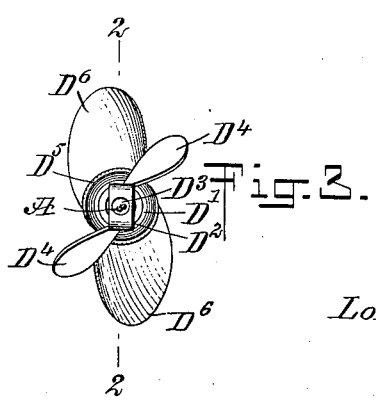
WITNESSES
INVENTOR
Lorenzo P. Gibson
BY
ATTORNEYS

UNITED STATES PATENT OFFICE.

LORENZO PRENTICE GIBSON, OF LITTLE ROCK, ARKANSAS.

ARTIFICIAL BAIT.

No. 841,506.  Specification of Letters Patent.  Patented Jan. 15, 1907.

Application filed June 20, 1906. Serial No. 322,568.

*To all whom it may concern:*

Be it known that I, LORENZO PRENTICE GIBSON, a citizen of the United States, and a resident of Little Rock, in the county of Pulaski and State of Arkansas, have invented a new and Improved Artificial Bait, of which the following is a full, clear, and exact description.

The invention relates to fishing; and its object is to provide a new and improved artificial bait arranged to readily spin or revolve around the hook whenever the device is drawn through the water as in ordinary fly-casting.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the view.

Figure 1 is a side elevation of the improvement. Fig. 2 is an enlarged sectional side elevation of the same on the line 2 2 of Fig. 3; and Fig. 3 is an enlarged front end elevation of the same, the snell being shown in section.

The snell or leader A of the fishing-tackle is attached to the shank of an ordinary fish-hook B by a suitable ganging C, on which is mounted to rotate loosely the tubular body D' of an artificial bait D in the form of a fly, the said tubular body D' being provided with a U-shaped head D², having a central aperture D³ for the passage of the snell A, as plainly illustrated in the drawings. The head D² is provided on its sides with small propeller-blades D⁴, and the tubular body D' is preferably provided with a cover D⁵, of silk floss or other suitable material, and to the covering are secured wings D⁶, arranged spirally and located diametrically opposite each other, as plainly indicated in the drawings. Now by the arrangement described the wings D⁶, as well as the propeller-blades D⁴, cause a rotation of the artificial bait D when the device is drawn through the water as in ordinary fly-casting. In order to permit free rotation of the tubular body D' on the ganging C and to hold the parts in proper relation to each other, one or more apertured beads E are provided, through which passes the snell A, and which are interposed between the end of the fish-hook shank B and the head D², as plainly indicated in Figs. 1 and 2.

The tubular body D', as well as the head D² and the propeller-blades D⁴, are preferably made of metal, while the wings D⁶ are preferably feathers, and, if desired, tail-feathers F may be ganged to the shank of the fish-hook B, at the rear end thereof, as plainly indicated in the drawings.

The device shown and described is very simple and durable in construction, readily revolves directly on the shank of the fish-hook—that is, in close proximity to the hook proper—and consequently the fish, attracted by the artificial revolving bait, are safely caught on the hook proper.

Having thus described my invention, I claim as new and desire to secure by Letters Patent—

An artificial fly comprising a tubular body for revolving on a fish-hook, a head on the body having an aperture for the passage of the snell, a wrapping of fibrous material on the body, said wrapping securing the head to the body, feather-wings spirally arranged on the body, propeller-blades on the head, and beads on the snell between the body and the head whereby to space said body and head from each other.

In testimony whereof I have signed my name to this specification in the presence of two subscribing witnesses.

LORENZO PRENTICE GIBSON.

Witnesses:
 J. E. ENGLAND, Jr.,
 J. W. KIRKWOOD.